Dec. 6, 1955   M. E. EVANS   2,725,784
MOTION PICTURE AND SOUND APPARATUS
Original Filed Oct. 10, 1949   7 Sheets-Sheet 2

INVENTOR.
Martin E. Evans

Dec. 6, 1955     M. E. EVANS     2,725,784
MOTION PICTURE AND SOUND APPARATUS
Original Filed Oct. 10, 1949     7 Sheets-Sheet 5

INVENTOR.
Martin E. Evans

United States Patent Office 2,725,784
Patented Dec. 6, 1955

2,725,784

MOTION PICTURE AND SOUND APPARATUS

Martin E. Evans, Brooklyn, N. Y.

Original application October 10, 1949, Serial No. 120,563, now Patent No. 2,661,652, dated December 8, 1953. Divided and this application March 17, 1951, Serial No. 216,139

16 Claims. (Cl. 88—16.2)

This invention relates to motion picture photography and more particularly to motion picture photography combined with sound recording.

In operation of a motion picture camera in diverse fields, it is desirable to take pictures at various frame rates, usually from 6 to 24 per second, and occasionally at much higher rates. With the change of frame rate and of the length of run of the film, it is desirable, for economy as well as technical reasons, to utilize various recording means including means actuated by sound modulated electric current. The rate of movement of the film past the sound recording means has an important bearing on the choice of recording medium. Again, it is desirable to monitor the sound recording while the picture taking is in progress. To effect smooth sound recording it is essential to move the film at a uniform rate.

It is an object of this invention to provide a combined motion picture and sound camera for use in diverse fields at various frame rates and with alternatively usable sound recording means. Another object is to provide a uniformly rotating sprocket to feed film to the picture taking and sound recording parts of the camera. Another object is to provide a plurality of sound recording means alternately usable at a common region on a feed sprocket. Another object is to provide sound reproducing means operable on the picture and sound film as it departs from the recording region.

In the operation of a sound recording motion picture camera in diverse fields the recording medium suitable in one does not fit to another. For instance, in the news reel field variations in light record sound on the film for transcription and use in motion picture theaters. If the camera is to have versatility of field use it must be adapted to record on magnetic tape also. To further extend its versatility, it should be adapted to record by stylus on a suitably prepared surface either permanently or temporarily arranged on the film as well.

Further objects of the invention and novel features will be apparent from the following specification when considered together with the accompanying drawing in which.

The subject matter of this invention is a division of copending application Serial No. 120,563, filed October 10, 1949, now Patent No. 2,661,652, isued December 8, 1953.

Figures 1, 2:
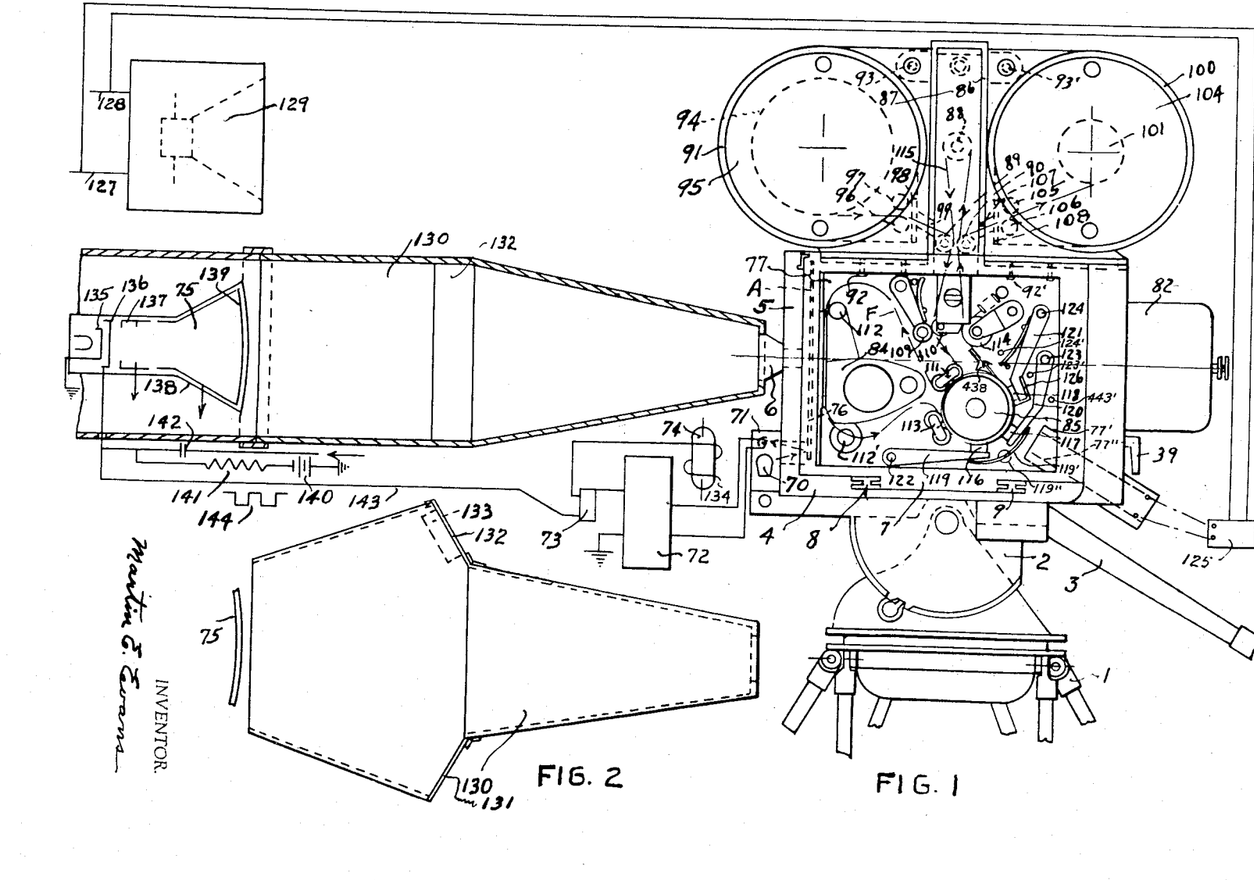
Fig. 1 is a front side view of a motion picture camera mounted on a tripod before a television receiver.
Fig. 2 is a plan view of a dark tunnel isolating extraneous light from that passing from the television receiver tube to the camera of Fig. 1.

Referring to Fig. 1, on a tripod 1 is mounted a pivoted head 2 with an adjusting handle 3. The head 2 carries a camera base 4 with a front upstanding member 5 on which is mounted lens 6. On the camera base 4 rests camera case 7 with grooved beams 8 and 9 between them holding the case and base in sidewise alignment by tongues from the member 4 and 7 fitting the grooves of beams 8 and 9 respectively. The degree of sidewise movement is shown in Fig. 4 where the outline 7' of the camera case 7 rests upon the beams 8 and 9 which are approximately halfway extended from the base 4.

Figure 3:
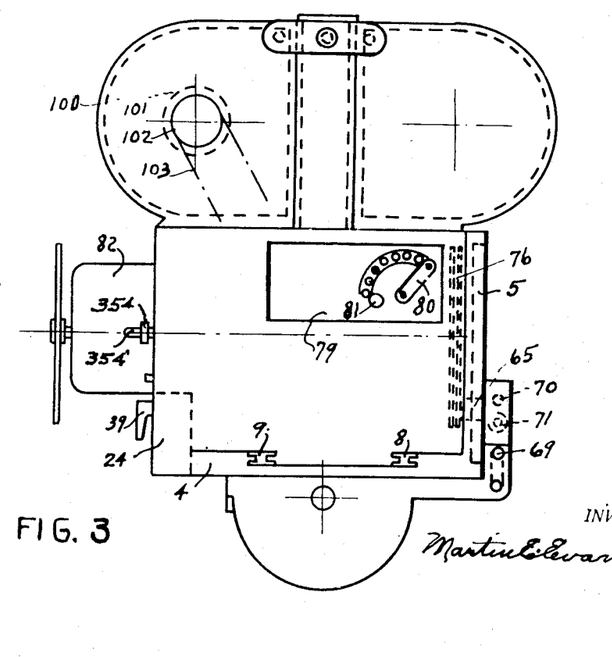
Fig. 3 is a back side view of the camera of Fig. 1.

The travel of the beams 8 and 9 is limited by pins not shown which are upstanding in grooves in the camera case 7 and depending in the camera base 4. Mechanical means to shift the camera case with respect to the base on which the case rests is provided. Only operating handle 39 is shown in Fig. 3.

Figure 4:
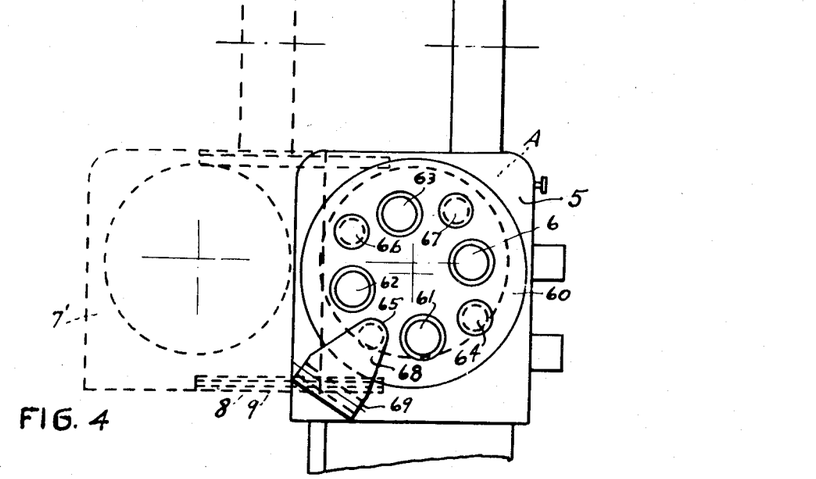
Fig. 4 is a front view of the camera of Fig. 1, showing the camera body shifted to one side to give access to a shutter chamber.

Referring to Fig. 4, the upstanding member 5 on the base 4 mounts a turret disk 60 which carries four lenses 6, 61, 62, 63, lens 6 being shown in position before the film aperture. Between the lenses enumerated are apertures and removable covers 64, 65, 66 and 67. These apertures extend through the turret disk 60. Upstanding alongside the member 5 is a housing 68 with pivot 69 in the base 4. On pivot 69 member 68 swings away from member 5 to give clearance for rotation of disk 60. In the housing 68 is a light source 70 and a photoelectric tube 71 shielded from each other. As shown in Fig. 3 and elsewhere, light from source 70 passes through aperture 65 to a revolving disk, to be used for control of the television receiver or other light source in photographic operations.

Referring to Fig. 4, the circular shutter is shown in dotted outline. This shutter is shown in full detail in the parent application with provision to completely close off its exposure aperture and so to provide for reverse operation of the mechanism and film under certain conditions. Included in these conditions would be a reverse run of the sensitive film to make preparation for a check on the sound recorded on the film.

The camera case 7 has a front end shutter compartment 76 accessible as previously described, a front side film handling chamber 77, and a rear side gear driving chamber 78 with an adjacent compartment 79 for accessories such as electrical connections, switches, resistances, shutter adjusting lever 80 and clutch control 81. From the motor 82 mounted on the rear of case 7 extends a drive shaft 83 through the gear chamber 78 to the shutter A in compartment 76. Intermediate of the motor 82 and shutter A, cross shafts take off power to drive the film pull down mechanism 84 and the film feed sprocket 85 in the film handling chamber 77.

Referring to Fig. 1, on top of case 7 is a narrow vertical chamber 86 with removable cover 87 and at its bottom connecting approximately midlength with chamber 77. In the chamber 86 is an upper roll 88 and a lower pair of smaller rolls 89 and 90. To the left of the chamber 86 is a film supply magazine 91 held in place by bottom bolts 92 and top bolt 93. In the magazine 91 a film supply reel 94 is rotatably mounted and is accessible by unscrewing of cover plate 95. A pair of rolls 96 and 97 in the magazine 91 guide film as it passes through light trap 98 and aperture 99 into chamber 86 to roll 89. To the right of chamber 86 is a film receiving magazine 100 held in place by bottom bolts 92' and top bolt 93'. In the magazine 100, a film receiving reel 101 is rotatably mounted and power driven through rear pulley 102 and belt 103 shown in Fig. 3. Magazine 100 is closed by screw plate 104. A pair of rolls 105 and 106 in the magazine 100 guide film as it passes from roll 90 on through aperture 107, light trap 108 to receiving reel 101. As the film leaves roll 89 it passes downwardly and between a pair of pressure rolls 109, 110, on to sprocket rolls 111, and sprocket 85, on in a loop to guide roll 112, on through the pull down mechanism 84 and out to a loose loop, then back over pressure rolls 113 and around sprocket 85 again and upwardly to buckle roller 114 and roll 90. In its passage from roll 89 around the path outlined back to roll 90, the film was in contact with an endless belt 115 which extends additionally from roll 90 up around roll 88 and back to roll 89 to complete the endless circuit. The belt is perforated and engages the sprocket and pull down mechanism the same as standard perforated film. When standard film is used the belt and film act as a unit. By matching the perforations the belt acts as a self threading device through the film handling chamber 77. Another use for the belt is described in connection with Figs. 15 and 16.

On the lower side of pull down mechanism is a mounting 112' for a second guide roll 112, thus providing inlet and exit rolls for film and belt to accommodate tight operation of the belt through the pull down passage for high speed continuous operation in connection with stroboscopic photography.

Again referring to Fig. 1, around the feed sprocket 85 magnetic heads 116, 117, 118 are on arms 119, 120, 121 respectively, which are hinged on pins 122, 123, 124 respectively, and spring pressed against the film F on sprocket 85 and an associated guide as the film lifts from the sprocket. The film F carries material suitable for magnetic action by the heads to provide a sound record to accompany the film and be available for immediate replay. Pins 122, 123 and 124, details not shown, are adjustable longitudinally in their mountings to position the various heads crosswise of the recording material for cooperation between the heads and the recording material. Head 116 is an erase coil fed with high frequency energy to demagnetize the recording material. Recording head 117 contains a main audio winding and an auxiliary high frequency coil, the latter in series with the erase coil to secure proper high frequency excitation. The audio winding is preferably energized with signal current from an audio amplifier 125. Head 118 which carries a shield 126 to isolate it from the recording head, supplies an amplifier, not shown, from which the sounds being recorded are recreated and thus an immediate check on the recording is provided.

Shields 126 may also be provided for the erase and recording heads where their close proximity to each other is a source of interference with their proper performance.

Figures 15, 16:
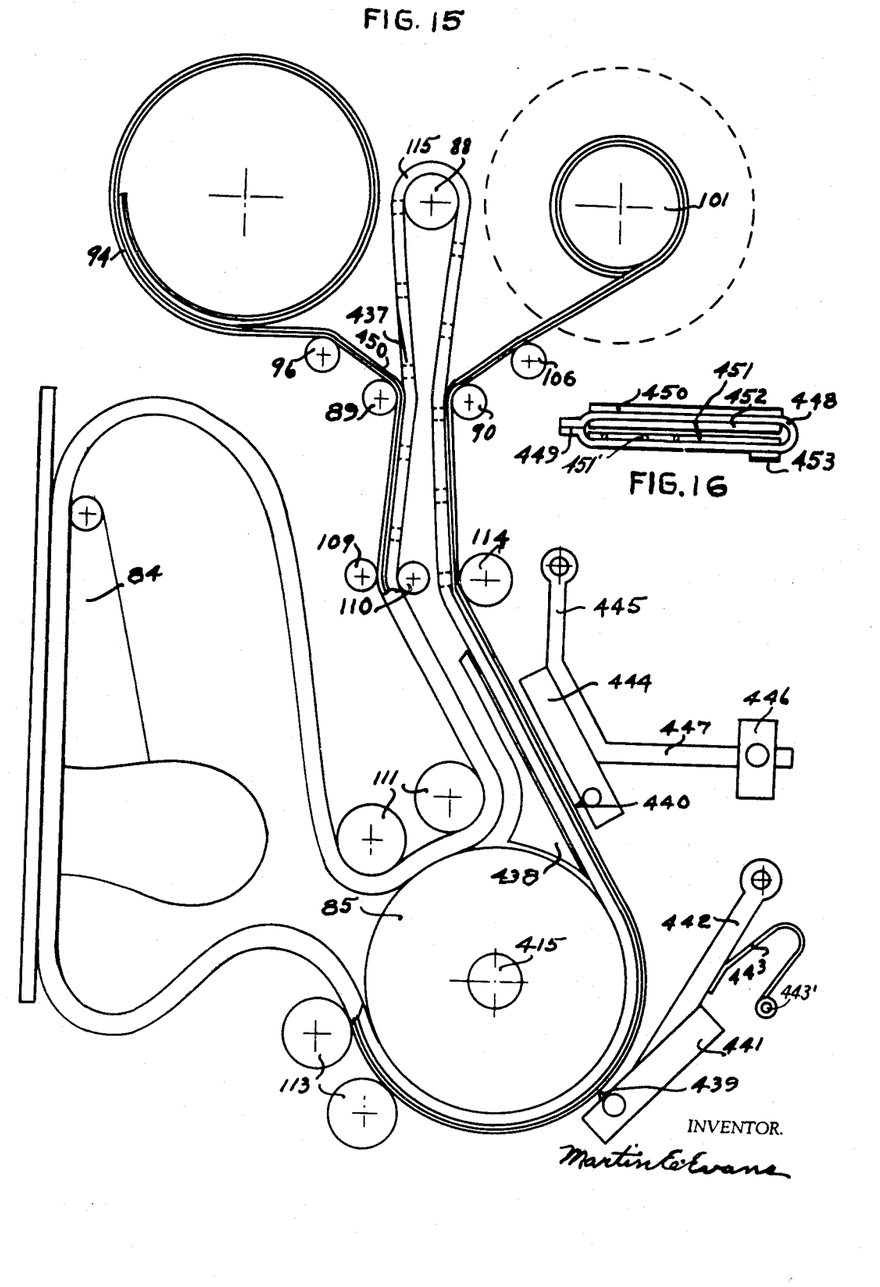
Fig. 15 is a diagrammatic representation of the film conveyor band and sound recorder.
Fig. 16 is an end view of the novel photographic element carried by the band.

The shoe 438, above the sprocket 85, and the openings 124' and 123' in the back wall of chamber 77 are provided for the adaptation of the apparatus shown in Fig. 15, for alternate use for sound recording by inscribing action. In the latter event, the pins 124 and 123 are disengaged from their positions as shown in Fig. 1, thereby facilitating removal of magnetic recording and reproducing members with suspensions 121 and 120 respectively. After the electrical connections are disengaged for members 118 and 117, the suspenders 445 and 442, with their members 449 and 439 respectively, may be suitably suspended from openings 124' and 123' by pins 124 and 123 respectively, and then electrical connections again may be established. It is obvious that the suspenders 121 and 445, also suspenders 120 and 442, may be reconciled as single units to accommodate the alternate support of the sound reproducing and recording units for action by engraving or magnetization. When these members are not reconciled, spring 443 for support 442 is retained by pin 443'. Spring 119, removably supported by forked pin 119'', may be removed, allowing member 119 to rest on the bottom of chamber 77 when inscribing head 441 is in operating position.

Referring to Fig. 1, the pin locations 123, 123', 124, 124' and 443 obviously may be each provided with its own pin accommodating axial adjustment thereon of the respective hangers for the respective recorders and reproducers, members 120 and 121 being in one plane over a sound track, the members 445 and 442 being in another plane over another sound track. The dispositions of the pins as illustrated facilitates the shifting of the respective agencies across the film. Where the individual agencies are mounted in combinations paired on pins, as for example members 442 and 120 on a single pin, they may be shifted along the pin as a unit and thus preserve the relative spacing across the film and save individual adjustment. Recording operations are determined by the nature of the recording material and by its location on the film base. The recording means are positioned to accord with the type of recording material to which it is adapted and to conform to the alternative operating procedure selected for following. Thus magnetic and inscribable recording materials may be arranged on the film base outside of the picture area to accord with the physical limitations imposed by the recording and reproducing agencies. The inscribable material, if of the variable light area type, would be recorded last for use with the pictures and the sound therefor would be taken from the magnetic reproducer. This by way of illustration only since numerous operating sequences are made available by the presence of multiple recording and reproducing agencies.

Where the recording stock is wide enough for three film tracks, the middle track may be regarded as the track on which the substitution will be effected by the movement along the supporting pins. In this case both combinations are employed on the three tracks. Where only a single track is available the substitution results in one of the pair remaining idle while the other is on the track. These procedures are useful in industrial applications.

Referring to Figs. 1 and 15, the magnetic sound recording head 117 and the inscribing sound recording member 439 are shown to function at a common point on the circumference of sprocket 85 to locate such recording on the film at a pre-selected distance from the coincidental image record. Also, light recording means retractably mounted but not shown in tube 77'' of member 77' in the wall of chamber 77 is positioned to function at the common point. The recording members are mounted to be selectively positioned for operation at the common point, such mounting accommodating selective displacement from the common point.

Details of the photographic sound recorder are set forth in U. S. Patent 1,984,438. In this latter apparatus a slit unit is mounted on a shoe adapted to fit up against the sprocket 85 in contact with the film. A glow lamp is mounted behind the shoe. The slit unit, its mounting, and the lamp form a cylindrical assembly that can be adjusted longitudinally of the lamp and radially of the sprocket in tube 77″. Since these details are not parts claimed in this application they are mentioned without illustration to show the recording relationships here operative. It is obvious that the head 118 and support 121 may be shaped and dimensioned for support from opening 124′ and may be backed by shoe 438 in place of by the sprocket 85.

To bring the photographic sound recorder into action, either of the other recorders which may be in position must be displaced as before mentioned. Then the apparatus of U. S. Patent 1,984,438 is extended out of tube 77″ and into cooperative action with sprocket 85 and amplifying member 125, the latter supplying suitably modulated current to the glow lamp.

Figures 12, 13, 14:
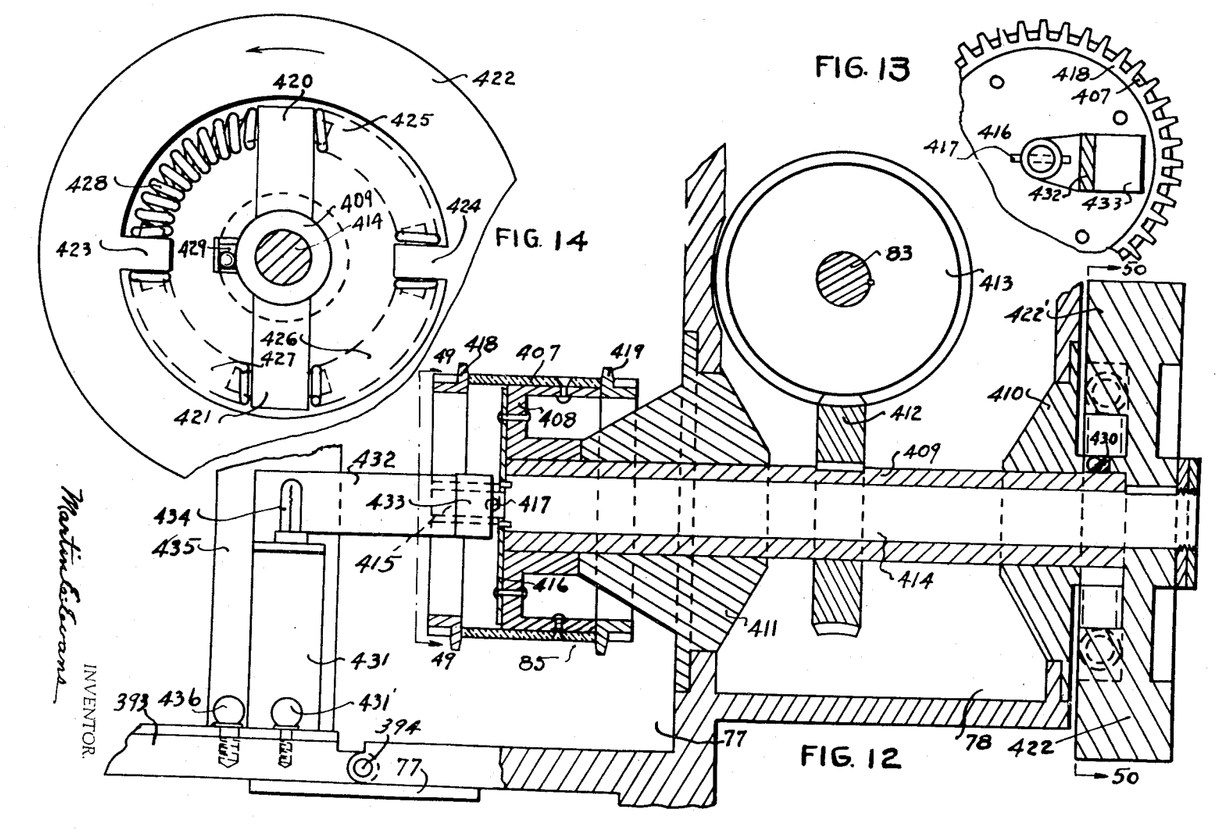
Fig. 12 is a vertical sectional view through the drive shaft and feed sprocket as shown in Fig. 1.
Fig. 13 is a vertical sectional view along the line 49—49 of Fig. 12.
Fig. 14 is a vertical sectional view along line 50—50 of Fig. 12.

To bring the photographic sound reproducer into action, the film must first be developed, then operated over the sprocket 85 as in the taking operation and with the slit unit close to the film. In this case the glow lamp is replaced by a photoelectric tube connected to amplifier 125. Referring to Fig. 12, light from lamp 434 is reflected from mirror 433 through the film and thereby progressively modulated as it passes through the slit unit to the photoelectric tube. The photoelectric tube and amplifier 125 supply the modulated current to the sound reproducing agencies required. This well known procedure is presented only to provide full statement of cooperative action with the novel features of this invention. However, the provision of engraved sound modulations on the film for sound reproduction in the above manner is set forth hereinafter.

While the illustration in Fig. 1 shows the magnetic head on one side only of the magnetic tape on the sprocket, as shown later in Fig. 12 the sprocket rim 407 in character and location is adapted to accommodate poles of a magnetic head internally and externally for perpendicular magnetization. In this connection reference is made to Figs. 106 and 107, pages 305 and 306 respectively with accompanying description in "Sound Motion Pictures, Recording and Reproducing," seventh edition, James R. Cameron, 1950. This reference covers use of a steel tape with frequency response from 150 to 4,000 cycles per second. For higher quality recording, the same authority, pages 382–398 inclusive, sets forth a range of equipment which may be adapted to inclusion in the camera. Ring type recording head is illustrated on page 398 thereof. This may be mounted on member 415 of Fig. 12.

As shown in Fig. 1, the camera is set up to photograph a television receiver cathode tube screen 139. The accompanying sound signals for the receiver are supplied by leads 127 and 128 to loudspeaker 129 from which leads extend to amplifier 125 and to head 117 for recording action on the photographic film. A dark tunnel 130, shown in plan in Fig. 2, and in vertical section in Fig. 1, excludes extraneous light from the lens 6 and tube 75. Access to the tunnel 130 is provided with side doors 131 and 132 which may be opened to provide a full view of tube 75. On door 132 is shown a light meter 133 for gauging the actinic value of the tube 75.

The original television images are usually lacking in contrast, therefore, it is desirable to exclude extraneous light to take full advantage of the contrast of the image on the screen.

Referring to Figs. 1 and 15, and particularly to the positioning of stylus 439 where substituted in the setting of Fig. 1 for the recording head 117, it is seen that material removed by the stylus 439 from the magnetic recording medium may by gravity descend to and accumulate on the floor of the film handling chamber 77. The delay in the removal of the material from the recording medium until it has passed the pressure plate at the exposure aperture insures that when there are grains of adherent displaced material on the carrier they will not abrade the pressure plate on the passing film. In this respect, the operating position of the stylus is of extreme importance in relation to the medium with which it functions. It insures both a good film and a good magnetic record.

The erasing head 116 in its action prepares the magnetic material for action thereon by the stylus. By erasing the previous recording of a variable nature in the magnetic material and leaving it in a uniformly magnetized state as it approaches the stylus, the material is in a state to receive a completed triple sound record from the one action of the stylus 439, the latter operating in a hill and dale manner and providing a variable bilateral path in the recording medium.

The hill and dale movement provides a means for mechanically actuating a sound reproducer. The variable width bilateral path provides an optical path for modulating light for sound reproduction. The variable quantity of remaining magnetic material at the successive cross sections of the strip provide magnetic force variable in accordance with the requirements for magnetic sound reproduction therefrom.

Further it is seen that if the sound so recorded is not to be promptly played back by the magnetic playing head 118, then the foregoing erasing and magnetizing action may be performed at the location of member 118 or subsequently to removal of the strip, as for example, when the film is being projected by the combination camera-projector.

Again the magnetic material may be provided in a uniformly magnetized state to the camera, in which case, neither erase nor magnetic head would be required to act, the stylus providing the recording action.

In the operation of the stylus for producing an optical record, it is obvious that the thickness of the magnetic coating must be fully penetrated thereby and a clear path made over the transparent base or carrier.

Referring again to Figs. 1 and 15, the stationary backing member 438 and the moving backing member 115 in cooperative action, particularly when either of the members 117 or 118 are substituted for member 444, serve to reduce the friction on the film as it proceeds along its operative path. The member 115 by its contact with the stationary member 438 assumes the friction load that would otherwise be on the film if the film were allowed to contact the member 438.

Figures 5, 6:
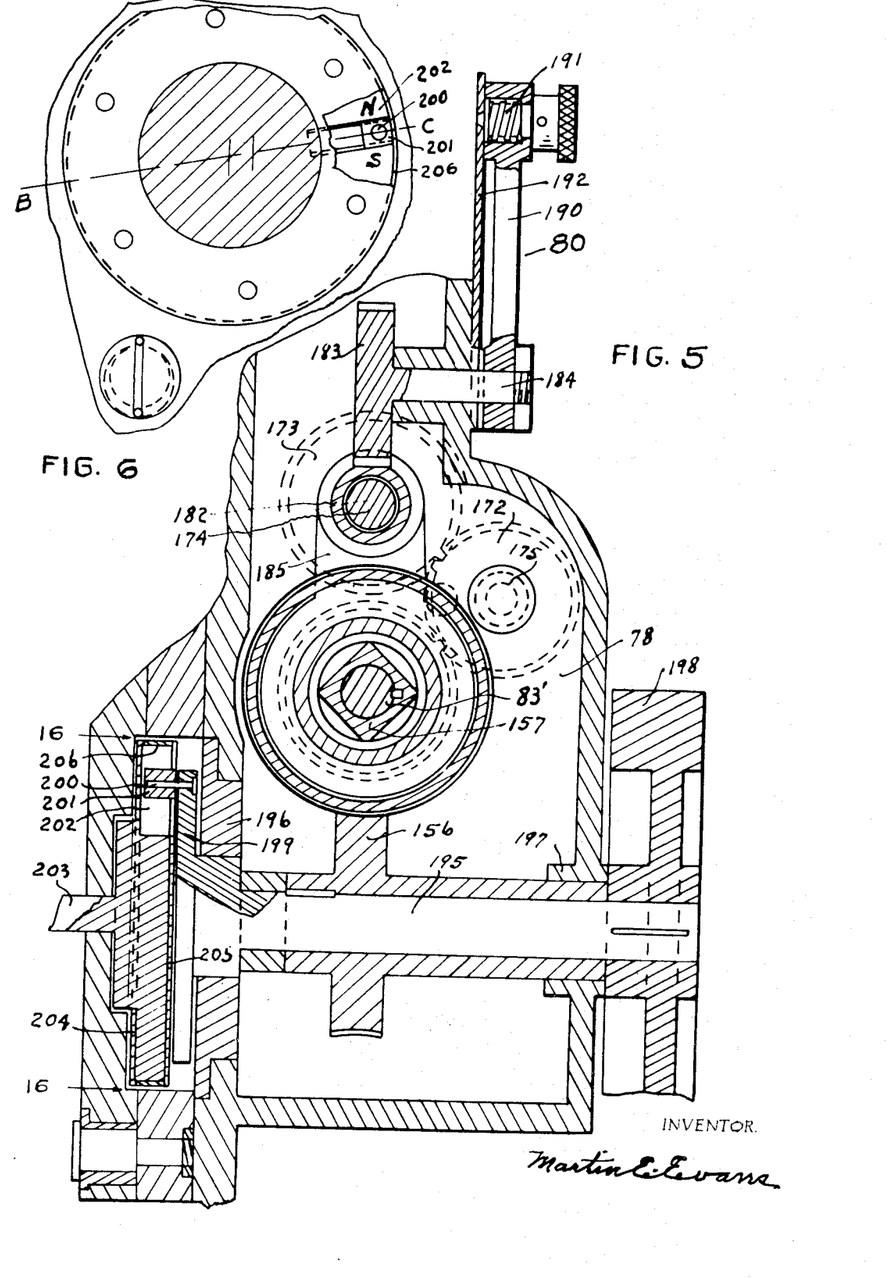
Fig. 5 is a sectional view through the pull down mechanism.
Fig. 6 is a vertical sectional view of Fig. 5 along the line 16—16, showing a driving connection to the pull down mechanism.

Referring to Fig. 5, the gear 156 is supported on shaft 195 having a bearing plate 196 adjacent the pull down mechanism and bearing 197. The bearing 197 supports the over-hung flywheel 198 on extension of shaft 195. Adjacent the bearing plate 196 is an over-hung disk extension 199 of shaft 195 carrying a crank pin 200 supporting a drive block 201. The block 201 fits into a disk 202 on shaft 203 which operates the pull down mechanism 84. The connection between the block and the disk 202 is in the nature of a radial slot covered wholly on one side by disk plate 204, partially on the other side by disk plate 205 and endwise by ring 206. The alignment of the shaft 203 relative to shaft 195 is offset so that the action of the drive pin and block is to provide an acceleration of rotary movement of shaft 203 on its down drive of the pull down mechanism 84. As shown in Fig. 6, the sides of the slot for block 201 are in the nature of a magnet having N and S poles between which the block may be held in radial position when the pull down assembly is removed from pin 200. Pin 200 may be removed when the camera is to be used at ultra high speeds and the pull down is immobilized in which case the belt 115 operates continuously around guide rolls 112 and 112′. The offset of shafts 195 and 203 relative to each other and to the median line of the pull down action is shown on line B—C in Fig. 6.

Figure 7:
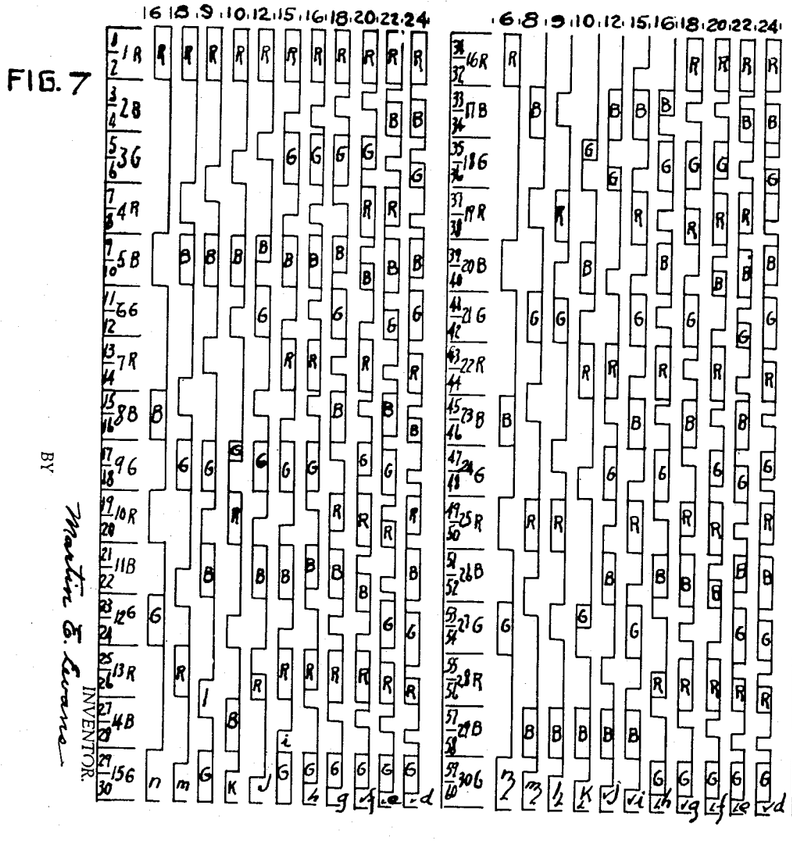
Fig. 7 is a divided time chart showing the relation between the events on a 30 frame television tube screen and the operative activities of a motion picture machine operating at various rates and recording sound.

Referring to Fig. 7, this chart is in two divisions headed by frames per second operation of the camera ranging from 6 to 24 frames. Extending downward to the left of the headings are divisions from 1 to 30 in the first and from 31 to 60 inclusive in the second division. These divisions represent time occupied by a television field at the rate of 60 per second. Alongside these divisions are numerals representing the television frame time, two fields being used for a frame. Alongside the frame numbers occur the letters R, B, G, representing red, blue, green, the primary color occurrences of which are transmitted by the noted fields and frames of television. The sequence of camera events and relative time periods are depicted in the vertical graph under each camera frame rate. The rectangular boxes represent the exposure periods. The line openings facing the right represent the pull down periods, and the line openings facing the left represent dark periods additional to the dark pull down periods. Thus under camera frame rates of 6 per second and opposite the fifth frame which is marked B we find in the graph the opening to the right indicating pull down period. The pull down period has been based on the use of a 72° shutter closure, the remaining 288° being open period. Also, the pull down period is shown to occur after exposure, so it is shown in all cases as the last occurrence in the camera cycle. The color values appear in black and white as first recreated on the receiver tube screen. Hence the need for color screens in photographing the screen is absent.

Figure 8:
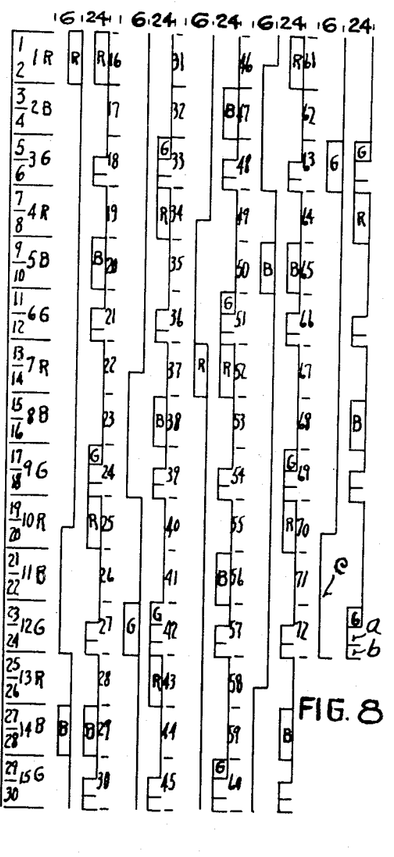
Fig. 8 is a chart similar to Fig. 7 for a television rate of 72 frames per second.

Referring to Fig. 8, graphs for camera frame rates of 6 and 24 per second and a television rate of 144 fields or 72 frames per second are presented, similar to Fig. 7. The horizontal line in the pull down portion of the graph indicates a division of the pull down time, $a+b$ being the pull down time for the usual running of the pull down mechanism, $b$ being the time for pull down with overrunning operation, and $a$ giving the additional interval of television picture made available for photography by the overrunning operation, so that full color fields are recorded as at 9G of the 24 frame rate.

Figure 9:
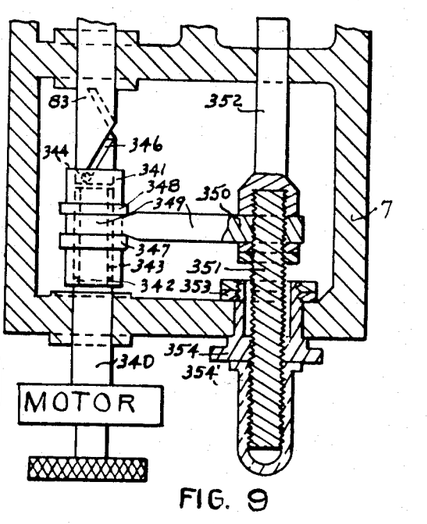
Fig. 9 is a horizontal sectional view of a phasing device between the motor and camera drive shaft.

Referring to Fig. 9, drive shaft 83 is shown terminating in abutment to the end of the motor shaft 340. A sliding tubular coupling 341 joins the two shafts. It carries at one end keys 342 which slide in straight longitudinal grooves 343 on motor shaft 340 and at the opposite end it carries key 344 which slides in helical groove 346 in the drive shaft 83. Both shafts have bearings in case 7. Between shoulders 347 and 348 on the coupling 341 a fork 349 engages the coupling and extends with stem 350 to a combination movable parallel to the aligned motor and drive shafts. The combination consists of a threaded rod 351 threaded into stem 350 and beyond to couple to a stem 352. Rotatably mounted in the wall in case 7 and retained by lock nuts 353, bushing 354 carries an internal thread through which extends threaded rod 351. Member 352 in alignment with rod 351 has a bearing in frame of case 7. Rotation of the nut 354 moves the fork 349 and thus shifts the coupling axially along the two shafts 340 and 83 phasing the pull down mechanism relative to the motor. Transparent thimble 354' internally threaded acts as a lock nut on rod 351 by pressure against bushing 354 and gives by the position of the end of rod 351 an index of the phasing position.

Figure 10:
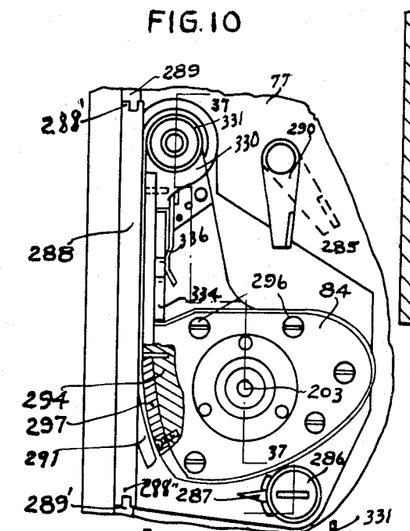
Fig. 10 is a side view of a modified removable pull down mechanism originally shown in U. S. Patent 2,144,277.
Figure 11:
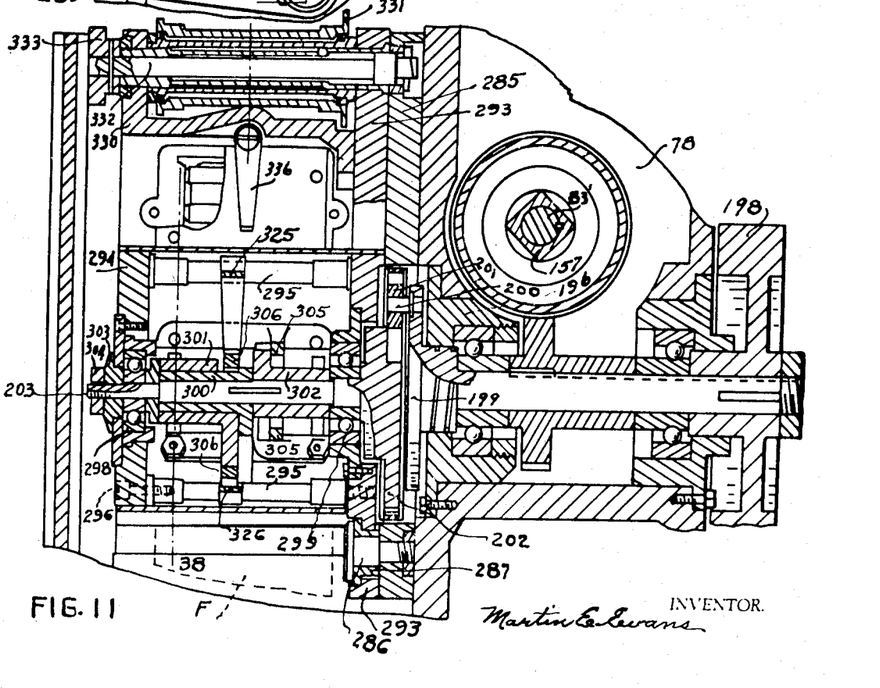
Fig. 11 is a vertical sectional view of the pull down mechanism along line 37—37 of Fig. 10.

On an L-shaped piece 285, identified in Figs. 10 and 11, is hinged pull down mechanism 84 by bolt 286 with eccentric washer 287 thereon adapted to position the pull down mechanism relative to the front upstanding branch 288 of the L member. Member 288 has top and bottom grooves 288' and 288" respectively, which removably support the structure in case 77 by engagement with case tongues 289 and 289'. The assembly is held against removal by pivoted member 290 attached to the case wall. Fastened in an inset in member 288 is a plate 291, the two having aligned exposure apertures not shown. The parallel back plate 293 and front plate 294 are held in spaced relationship by separators 295 screwing into plate 293 and receiving screws 296 through plate 294. Film guide plate 297 extends across the plates 293 and 294 and the intervening space. Plate 293 extends below 294 and has rests on the bushing 287 which pivots the pull down to the L member 285. The pull down drive shaft 203 is carried by bearings 298 and 299, identified in Fig. 11. On the shaft 203 are mounted cam members 300, 301, 302 held in position by spacers terminating with exterior member 303 driven by the shaft and held in place by nut 304. Between the side plates 293 and 294, a pair of beam members 305 and 306 are mounted for intermittent pull down and locking operations on the film.

Referring to Figs. 12 to 14 inclusive, sprocket wheel 85 is shown as a composite structure made up of a transparent cylindrical element 407 mounted on an inner hub 408 to which it is riveted. Hub 408 is rotatably supported on tubular shaft 409 carried by frame bearing members 411 and 410 in the walls of gear chamber 78. Midlength of member 409 is mounted a gear 412 keyed to the tube and driven by gear 413 mounted on main drive shaft 83. Tubular shaft 409 is below and at right angles to drive shaft 83. Extending through the tubular member 409 is shaft 414 which has a reduced section 415 in the vicinity of hub 408. Over the section 415 fits plate 416 dowelled in the shaft 414 and there held by pin 417 to rotate therewith. Plate 416 is riveted to hub 408 and transmits motion thereto from shaft 414. Under some circumstances plate 416 and ring 418 are constituted as a unit and serve to drive the film supported on cylinder 408. Both ends of cylindrical member 407 have notches into which fit the teeth extending radially from rings 418 and 419. Adjacent the bearing 410 the tubular shaft 409 has radial arms 420 and 421 which fit within the rim 422' of flywheel 422 supported on an extension beyond shaft 409 of shaft 414. Flywheel 422 is keyed and locked on shaft 414. Extending radially inwardly from rim 422' of flywheel 422 are lugs 423 and 424. Between the lugs and radial arms and supported on extensions thereof, are springs 425, 426, 427 and 428 which establish yielding drive connection between tubular shaft 409 and axial shaft 414. In a cavity 429 on the inner side of the hub of flywheel 422 is carried a ball adjacent the face of bearing 410 against which it is pressed by a yielding member 430 in the cavity 429. The face inside the cavity against which the ball presses is angularly disposed so that the ball under the pressure of the yielding material is wedged between the flywheel 422 and the bearing plate 410 on the backward rotation of the flywheel. This lock against backward rotation is used only in those applications where motion is harmful as where needle recording of sound on film on sprocket 85 is undertaken.

In operation the irregularities of driving force between sprocket 85 and gear 412 are smoothed out by the floating action due to the springs.

The inertia effect of flywheel 422 is supplemented in its action on sprocket 85 through belt 115 in contact with member 88. In certain cases of slow speeds of operation where the wheel 422 is insufficient, the mounting for member 88 extending to the rear carries a supplementary detachable wheel not shown since its operation at the professional rate of 90 feet of film per minute would provide a possible overload. Its location lends to manual detachment and lightening of the portable combination.

Momentary variations less than 8 cycles per second are annoying by reason of the change in pitch which they produce. Such variations between 8 and 100 cycles per second are recognized in roughness of tone quality. These inertia devices to remove the variations in connection with reproduction of sound are also coupled for use with the sound recording and in this service both devices provide a cascade action new to picture and sound recording apparatus. Within the ranges cited objectionable variations are suppressed.

The door 393 hinged to case 7 is held in a horizontal position by plate 77' when the door is opened for converting the camera to a projector. With such door position, thereon is mounted a standard 431 by thumbscrew 431'. Member 431 has an arm 432 fitting over the extension 415 of shaft 414, thus supporting an angularly disposed mirror 433 within the tubular transparent member 407 in a position to reflect light from a tube 434. Light from tube 434 reflected by mirror 433 is directed through member 407 and against a film thereon in continuous motion. The light passing through a sound record path on the film is utilized in means not shown to recreate the recorded sound.

While the light 434' is shown mounted on the door 393 with the door open, it may be mounted on the door in its closed position with light guard and mounting means not shown. This latter mounting would be operative to provide reproduction of sound in the same manner as previously outlined for Fig. 12, but not for monitoring purposes where the sound record is inscribed before the picture is recorded. It is well known to have the stylus 439 operate transversely of the film to remove pigment or other light obstructing material carried by the transparent base to provide a variable area modulated by sound.

On door 393 standard 435 is held by thumb screw 436 in position adjacent pull down member 84 to support tube 74 and a mirror not shown which direct light through the aperture uncovered by removal of roll holder 334. The light passing through the said aperture passes through the film between members 291 and 297 of the pull down and out to the projecting lens mounted on turret 60. Suitable condensing lens adjacent flash tube 74, also, is contemplated to be in the set up.

Referring to Fig. 15, an enlarged view is shown of the conveyor belt 115 on which is provided a flap or guard 437 with the tail in the trailing position and beneath which the lead end of the film F is to be tucked for threading through the mechanism in the circuit back to roll 90. At roll 90 the flap is lifted and the lead end of the film F is threaded around reel 101. As the conveyor 115 and accompanying film pass from feed sprocket 85 and over shoe 438 the shoe acts to lift the conveyor and film off the sprocket and to support the film in position for sound reproduction by stylus 440 acting in a groove produced by preceding stylus 439. Member 439 is electromagnetically activated to engrave on the passing film a groove of varying depth or varying width or a combination in a manner well known to the art of recording sound. Member 440 operating in the groove just formed agitates associated electromagnetic means which causes variations in an electric circuit that form the basis for sound reproduction. The stylus 440 immediately following the engraving operation provides an immediate check on the adequacy of the engraving operation. Stylus 439 in case 441 on arm 442 is pivoted to swing toward the sprocket 85 under the impetus of spring 443. Stylus 440 in case 444 on arm 445 is pivoted to swing toward shoe 438 under the impetus of adjustable weight 446 on arm 447.

The apparatus is adapted to various sequences of operation. The obvious sequence is shown in Fig. 1. Another sequence may originate in recording the sound and then recording the pictures, utilizing the sound record during picture recording to give aural guidance for facial expression or action to the actors in the field of the camera. In this sequence the film may pass with a single continuous arc of contact around the drive sprocket and by-pass the pull down on its way past the recording and reproducing stations. As the sound is recorded it is reproduced from the record rather than from the usual input modulations so making a check on the adequacy of the record. Thus if the record is inadequate it may be erased by reverse operation of the film past the erasing head and again on the forward motion of the film as the corrective recording occurs. When this recording takes place, the intermittent film feed mechanism may be entirely removed by movement of latch 290 shown in Fig. 10, and by lateral travel along the tongue and groove mounting. In this case the feed to and the take-up from the usual loop of film by the sprocket may occur in the vacated space.

Another sequence of operation involves the recording of the pictures first, then development of the pictures, then the recording of the sound while using the apparatus as a projector, then fitting the sound to the action depicted. Here either stylus or magnetic recording may be employed.

Another sequence of operation involves recording the sound first, then the pictures using sound record for picture direction and adding sound as the pictures are taken, the latter by lateral adjustment of the stylus recording medium as published in "Sound Reproduction," G. A. Briggs, published by Wharfedale Wireless Works England, 1950, reference page 132.

Again, a sequence of operation contemplates recording sound first by stylus after the Phillips-Miller system of the above reference, then simultaneously recording pictures and reproducing the sound for direction of the picture, sound reproduction by light suitably guarded and directed from the interior of and through the sprocket to the sound record. As the light passes on from the modulating film, through the slit unit fitting up against the film and through the cylindrical mount for the slit unit to the photo tube activated by the light, as recited for reference U. S. Patent 1,984,438, the sensitive picture emulsion is shielded from the light by the yielding movement of the shoe supporting the slit unit. Additional sound record at this time may be provided by having the engraving tool 439 and actuating member 441 substituted for members 440 and 444 (shown in Fig. 15).

In view of these various sequences of operation of the apparatus herein disclosed, the sprocket 85 assumes an added importance over that accorded it in the usual picture and sound camera combination. It continues to be a feed and take-up sprocket in the usual sense. However, it does more than that by reason of (1) its position in the assembly, (2) its peripheral rate of travel, (3) its arrangement to operate on photosensitive film for sound recording, and (4) its construction. Its position relative to the magazine and sound devices enables them to function by themselves as a sound recording and reproducing assembly, eliminates manual handling of the film in placing it for picture taking after sound recording, and makes a single magazine serve for running the film at separate times for sound recording and picture recording irrespective of which operation takes precedence.

The sprocket peripheral rate of travel when functioning in the sound recording assembly determines (1) the dispostion of the sound record longitudinally on the film and (2) the lineal travel rate of the film. By providing the same sprocket peripheral rate for the film when recording sound as will be provided when recording pictures sychronous operation of sound and pictures is assured during projection. This is provided for automatically where the sound and picture records are made simultaneously on film propelled by the single sprocket, obvious, but quite overlooked usually as a function of the sprocket as operated during simultaneous recording.

The sprocket's operation on the photosensitive film is exclusive to this disclosure in that force from the sprocket on the oncoming film is extended to the film off going from the sprocket to assure steady film movement past a sound device adjacent to the sprocket. As illustrated in Fig. 15, the means for extending this force include the belt and supplemental guide rolls and a pulley. Other expedients assist in the arrangement, such as the tensioning roll 14.

The sprocket's construction with a cylindrical transparent zone for passage of light outwardly to a sound record on the film provides conditions for a stylus formed record to modify the light for sound reproduction. Here the sprocket not only provides propulsion to the film, it coordinates light, light modulating record, and light receptive agencies for synchronous sound reproduction for direction of the recording of pictures on the film.

While the figures illustrating the sound recording and reproducing facilities place these instrumentalities at separate locations, it is well known to the art that the stylus recording heads may be converted to reproducer heads by switching electrical connections thereto. Such action is contemplated particularly where the picture and sound recording are made one after the other, though the switching mechanism is not shown.

As an example of a known engraving medium suitable for hill and dale recording mention is made of a fine skin of black mercuric chloride applied to the gelatine layer on the film base. This is particularly useful for sound reproduction by a light activated system as illustrated in Figs. 1 and 12.

Referring to Figs. 15 and 16, a composite film is shown comprising a longitudinal strip of material such as cellophane for example, folded along its longitudinal axis as at 448 and having its adjacent folded edges 449 held together as by Scotch tape type of adhesive permitting subsequent separation. Outer surface 450 carries an adhesive of the Scotch tape type such as is adapted to separation from conveyor 115. Inner surface 451 is coated with a photographic emulsion. Inner surface 452 is coated with developer and fixer. After exposure it is only necessary to introduce moisture between the surfaces to effect quick development. The emulsion within the envelope is only slightly adhesive and is readily removed if such action is desired, making the envelope again available for use. On the outside of the envelope adjacent to the emulsion 451 is a strip of material 453 adapted to sound recording. If the recording is by stylus the strip is in the nature of a wax or resin coating adapted to engraving. If the recording is by magnetic means, the strip is of material accepting alteration by magnetic means and suitable to the requirements for permanent record. The thickness of emulsion is determined by transparent particles 451' embodied in the emulsion which act as separators when the two surfaces of the envelope are pressed together, particles of hardened emulsion.

The alteration of the recording material by magnetic means involves a time factor. This factor has been determined by the time of travel of the recording material past the recording head. The longer a given segment of recording material can be subjected to the magnetizing influence assigned to that segment, the theory is that, the stronger will that influence be impressed upon that segment. This stronger remanent effect in the segment will more efficiently act upon the reproducing head later. Among the alternative modes of operation available for the mechanism of this invention, reference is made to that for recording sound on the unexposed film and from a previous magnetic sound recording and then recording the pictures. It is first necessary to provide the modulated currents for recording to the leads 127 and 128 leading to the recording head 117, as shown in Fig. 1 for reception from the television receiver. The television sound receiver is regarded as only one of several means for providing "modulated currents" for recording. A magnetic sound reproducer adapted to varying rates of operation is adapted to provide the modulated currents required from the magnetic record by connecting the reproducer circuit to the leads mentioned.

Assuming the film rate is to be 24 frames per second and the footage rate of the magnetic record 18 inches per second, which is the standard for 35mm film practice, the film and magnetic record have the same lineal movement per second and if they are united they will have automatic synchronization of movement. Assuming that magnetic recording medium 453 of Fig. 16 is wide enough for a double sound recording, and that the first recording has been recorded by head 117 by a first run through the combination as a recorder only, and that the film has been rewound to the supply magazine, and that the recording had has been shifted to the second track of the magnetic material with the reproducing head placed on the record track with the reproducer coil connected to leads 127, 128 and with member 129 inactive, then the apparatus is in a position to record with a remanence acquired after the fashion before stated. By operating the camera at 6 frames per second only as a sound mechanism, the given segment of recording material will be subjected to the magnetizing influence assigned to that segment four times as long as the time for the first recording. Rewinding the film to the supply magazine, the erasing head may be applied to erase the first record, or the latter may be allowed to remain to provide an echo effect. The third run of the film may then be made to record the pictures, utilizing the sound record to give aural guidance for action in the field of the camera.

The theory of magnetic recording is that a magnetic field brought to bear upon a material capable of being magnetized, such as an alloy 80 percent cobalt and 20 percent nickel, will rearrange the internal structure submicroscopically. If the magnetic field is modulated to represent the changes in frequency of sound the varying magnetic field will variably magnetize the material and provide a record in the material, provided the material has a uniform movement within a suitable speed range. A magnetizable material as above having a plated coating thickness of 0.0003 inch has proved satisfactory. The remanent magnetization in the medium at any point is directly proportional to the momentary value of the modulation at that point along the material. The recording medium has transfer characteristic which to be utilized must be uniform through the medium section. The conditions of magnetization of the medium should be uniform, that is the magnetizing force should be applied from a definite position relative to the medium, preferably the magnetizing agency should be continuously in contact with the medium and the tension on the medium should be uniform so as not to unduly stretch and vary the transfer characteristic. To meet the foregoing theoretical conditions this invention has provided new disposition of various agencies.

The theory of sound reproduction from the magnetic recording is that movement of the recording medium with its varied remanent magnetization through the field of an electromagnetic coil will provide variations in the circuit proportional to the varied record in the medium. The agency by which this is done is in accord with the agency by which the record was made. Preferably the reproducing agency should be continuously in contact with the medium. The tension and rate of movement of the medium in recording and reproduction preferably should be the same. It is a problem to provide means to keep them the same and which problem is solved in the present camera sound combination.

The sound recording operations herein disclosed utilize change in position of the recording medium, change in an electric circuit having electric variations proportional to sound frequencies to be recorded and applies the power of the circuit at any instant to affect the recording medium in degree proportional to the current or voltage at the instant. Thus successive increments of time provide successive increments of distance along the recording medium with a record at each increment representing change in the power circuit if there be change. The system is reversible for sound reproduction. The sound recording and reproducing operations as outlined prefer contact between recording medium and associated agencies having the electric circuit to eliminate variations in recording. This contact requirement necessitates resilient mountings for the circuit agencies to compensate for variations in the thickness of the recording medium as it passes around the sprocket and over the supporting shoe. The increments of distance along the recording medium are provided only by the sprocket.

In the recording mediums herein employed, the theory is that the material thereof is physically displaced to provide the record. In the magnetizing operation the displacement is submicroscopic interiorly of the body and is not subject to direct visual observation. In the inscribing operation the displacement is exteriorly of the medium and directly observable.

The sound recording and reproducing stations beside having means to give longitudinal movement to the film, have members 117 and 118 in one case and members 441 and 442 in another case carrying portions of electric circuits (not shown) adapted to provide electro-magnetic fields. The fields of members 117 and 118 normally overlap and take in the moving film. A guard 126 separates the fields thereby permitting their assembly close together around the sprocket 85. This close assembly admits the use of a common backing of the sprocket to the members and thereby eliminates the vibrations in the film at the point of sound reproduction, vibrations incident to separation from the sprocket teeth.

Referring to Fig. 15 and to the film base folded to include the emulsion, the flexibility of the portion of the base joining the folded parts is a property due in part to the nature of the material and in part to the thinness of the section. It affects in the present case the transfer characteristic of the combined base and recording material in so far as the operations of magnetic and inscribing sound recording and sound reproducing are involved. In the handling of the base and recording material through the apparatus, variations of stress occur in the combination longitudinally and crosswise that have to be kept low enough to prevent disturbance of the base and recording material. Such stresses beget changes in the transfer characteristic of the material for both recording and reproducing sound and incidentally in the emulsion particularly where the base is less than the usual 0.005 inch in thickness. With the base folded the emulsion is along the neutral axis where bending stress is theoretically zero. As the film goes on to sprocket 85 in the standard manner it is relatively free from tensile stress. If it is borne by member 115 it is further freed from such stress. By the placement of the recording agency at the mid point of the arc of film over the sprocket, the sprocket teeth are enabled to hold the stress of take-up pull from traveling back to the recording area, particularly with standard film. With the folded film and the member 115, such stress does not get back much past agency 90 if at all. With the member 115 prestressed for operation in and out of the case between the magazine and the sprocket and the film borne on member 115, the latter is enabled to take practically all tension involved in the film transport. In this event the thickness of the folded film may be lowered considerably below the standard 0.005 inch and may thus acquire increased flexibility and promote the handling mentioned in connection Fig. 16. Operating the film shown in Fig. 16 over the sprocket for recording assures a minimum of the noted transfer disturbance. Operating the said film over shoe 438 and borne on member 115, continues this assurance of freedom from stress.

The various mechanical arrangements presented and their description are by way of illustration only and it will be understood that other mechanical arrangements and devices may be employed to effect the modes of operation and the results described. Other arrangements, modifications and variations will occur to those skilled in the art to which the invention is related. Accordingly, my invention should be understood as not restricted to the specific embodiments illustrated and described but as including all embodiments coming within the scope of the following claims.

I claim:

1. In motion picture and sound apparatus including a motion picture camera having a drive sprocket feeding film from an exposure aperture and past a sound station, the combination in said station of recording means carrying electric current modulated to the frequencies of sound for cooperative action with a recording medium on said film; a mounting for said recording means allowing shifting of the latter resilient pressure means for urging said recording means against said film, backing means for limiting the lateral movement of said film and recording means before said pressure means comprising a stationary member and a linearly moving member having a driving connection to said sprocket, said linearly moving member traveling with said film and in the absence of propelling tension in the latter causing the latter to move past said sound recording station.

2. In motion picture camera and sound apparatus having a drive sprocket and intermittent film advancing mechanism and a film magazine on said camera, the combination with said sprocket of means adapting same to advance said film from said magazine through said camera and back to said magazine, means to lift said film from said sprocket during said travel movement and to eliminate sprocket tooth flutter incident to said removal including a longitudinal guide member having a face plane thereof aligned tangentially to the peripheral face of said sprocket with an end of the plane fitting closely to the sprocket thereby providing with said sprocket a practically continuous plane along the operating path of the film for support of the latter at a sound recording and reproducing station; a first pressure means positioned adjacent said sprocket, a second pressure means positioned adjacent the end of said longitudinal member remote from the sprocket whereby the film is constrained to said sprocket and longitudinal member, an electromagnetic coil adapted to bear electric currents modulated in accordance with sound frequencies and adapted to cooperative action with said traveling film, and a mounting for said electromagnetic coil positioning same for said cooperative action with said lifted film.

3. In combined sound and motion picture apparatus, a casing with an exposure aperture therein, a sprocket rotatably mounted in the casing for feeding a film and sound recording material thereon from said aperture, pressure means for maintaining said film and material in the order named jointly curved about said sprocket, one of said pressure means being somewhat apart from the sprocket on the film departing side of the latter, backing means for the film positioned between the sprocket and said apart pressure means, means contacting said sound recording material for recording sound, a mounting for said contacting means between said pressure means permitting to and from movement relative to said recording material, means for maintaining said recording means in contact with said recording material, and in the absence of substantial tension in said film for propelling same a backing member detachably attached to said film by pressure adhesive means and operatively connected with said sprocket whereby said film and recording material are propelled around said sprocket and over said backing means toward said apart pressure means.

4. In combined sound and motion picture apparatus, a casing with an exposure aperture therein, a sprocket rotatably mounted in the casing for feeding a film and sound recording material thereon from said aperture, pressure means for maintaining said film and material in the order named jointly curved about said sprocket, one of said pressure means being somewhat apart from the sprocket on the film departing side of the latter, backing means for the film positioned between the sprocket and said apart pressure means including a supporting member mounted on the casing and a traveling member having driving contact with said sprocket, said traveling member sliding over said supporting member at the lineal rate of said film and imparting to the film lineal movement in the absence of substantial tension in the film for the moving action, means contacting said sound recording material for recording sound thereon, a mounting for said contacting means opposite said supporting member permitting to and from movement of recording means relative to said support, and biasing means effecting said to and from movement to accommodate changes in thickness of said recording material.

5. In combined sound recording and motion picture apparatus, a camera casing with an exposure aperture therein, a sprocket rotatably mounted in the casing for feeding a film and sound recording material therewith to and from said aperture, means including rollers for maintaining said from operated film and sound recording material curved in the order named about said sprocket, one of said rollers being somewhat distant from the film departing side of the sprocket, backing means for the film positioned between said apart roller and the sprocket, means contacting said sound recording material for recording sound, a mounting for said contacting means permitting movement of the latter to and from said material, means for pressing said contacting means against said material, and in the absence of tension in said film for propelling same a backing member detachably attached to said film by pressure adhesive means and operatively connected with said sprocket whereby said film is propelled around said sprocket and over said backing means toward said apart roller for said sound recording operation.

6. In apparatus as claimed in claim 5, sound reproducing means contacting said sound recording material oppositely to said backing means between said distant roller and sprocket.

7. In combined sound and motion picture apparatus, a casing with an exposure aperture therein, a sprocket rotatably mounted in the casing for feeding a film and magnetic sound recording material thereon from said aperture, pressure means for maintaining said film and material curved about said sprocket, one of said pressure means being somewhat apart from the sprocket on the film departing side of the latter, backing means for the film between the sprocket and said apart means, magnetic sound recording means, a mounting for said recording means between said film pressure means permitting to and from movement of the recording means relative to the recording material, means for maintaining said recording means in contact with said material, and in the absence of sufficient tension in the film to propel same in its operating path around said sprocket and toward said film bending pressure means, a backing member detachably attached to said film by pressure adhesive means and operatively connected with said sprocket.

8. In apparatus as claimed in claim 7, sound reproducing means operatively contacting said magnetic material opposite said film backing means whereby the film is steadied for sound reproduction.

9. In a motion picture and sound recording camera wherein a sprocket feeds a film to and from a movement mechanism and the mechanism pulls the film intermittently past an exposure aperture at a selected frame rate that governs the feed rate of the sprocket, wherein sound recording mechanism is backed by said sprocket and through said sprocket is controlled by said movement mechanism, and wherein said frame rate is selected to provide a joint lineal movement of combined film and magnetic sound recording medium suited to recording a range of sound frequencies acceptable for accompanying said film, interconnected driving means between said movement mechanism and sprocket and thereby said film and recording medium past said recording mechanism at said lineal rate, the latter mechanism including a stylus for acting upon said recording medium, a mounting for said stylus permitting hill and dale movement of the latter thereby displacing portions of said medium, and means for actuating said stylus at said frequencies, whereby a bilateral path in said recording medium is formed having modulated quantities of magnetic material to the sides thereof and modulated hill and dale recordings in the bottom thereof, the said side quantities forming a magnetic sound record, the said hill and dale recordings forming a mechanical record.

10. In a motion picture and sound recording camera, the invention as recited in claim 9 wherein the thickness of the magnetic material is sufficiently limited to permit division thereof by said stylus, so that the transparent film base below the magnetic material becomes revealed between the strips of stylus divided magnetic material and the clear path therebetween providing a bilateral light modulating agency for sound reproduction optically.

11. In a motion picture and sound recording camera wherein a sprocket feeds a film to and from a movement mechanism and the mechanism pulls the film intermittently past an exposure aperture at a selected frame rate that governs the feed rate of the sprocket, wherein sound recording mechanism is backed by said sprocket and through said sprocket is controlled by said movement mechanism, and wherein said frame rate is selected to provide a joint lineal movement of combined film and magnetic sound recording medium suited to recording a range of sound frequencies acceptable for accompanying said film, interconnected driving means for synchronously operating said movement mechanism and sprocket and thereby said film and recording medium past said recording mechanism at said lineal rate, the latter mechanism including a stylus for acting upon said recording medium, a mounting for said stylus permitting hill and dale movement of the latter thereby displacing portions of said medium and means for actuating said stylus at said frequencies, whereby a bilateral path in said recording medium is formed having modulated quantities of magnetic material to the sides thereof, the thickness of the magnetic material being sufficiently limited to permit division thereof by said stylus, so that the transparent film base below the magnetic material becomes revealed and with said modulated quantities of magnetic material bounding said revealed portion of film provides a bilateral modulating agency for sound reproduction optically.

12. In a motion picture and sound recording camera, the invention as recited in claim 11 whereby hill and dale impressions of said stylus in said revealed transparent base are formed suitably to actuate a reproducing stylus.

13. In a motion picture camera wherein a sprocket feeds a film to and from a movement mechanism and the mechanism pulls the film frames intermittently past an exposure aperture, wherein the sprocket backs a sound recording mechanism, and where the intermittent frame rate is such that joint movement of the film and opaque magnetic sound recording material thereon occurs at a lineal rate around the sprocket permitting recording of a range of sound frequencies acceptable for accompanying said film, interconnected driving means between said movement mechanism and said sprocket for synchronously operating said movement mechanism and sprocket and thereby said film and recording medium past said recording mechanism at said lineal rate, the latter mechanism including a stylus for acting upon said recording medium, a mounting for said stylus permitting hill and dale movement of the latter thereby displacing portions of said medium, means for actuating said stylus at said frequencies, whereby a bilateral path in said recording medium is formed having modulated quantities of magnetic material to the sides thereof, and an erasing head effective on said magnetic material ahead of said stylus for erasing previous recordings in said material and for leaving same in a uniformly magnetized condition.

14. In a motion picture and sound recording camera, the invention as recited in claim 13, in combination with a magnetic reproducing head positioned along said magnetic material so as to be actuated by the varying magnetic intensity of said magnetic recording material provided by the recording action of said stylus.

15. In a combined sound and motion picture camera, a film feeding sprocket, a longitudinal guide member having a face plane thereof aligned tangentially to the peripheral face of said sprocket with an end of the plane fitting closely to the sprocket thereby providing with said sprocket a practically continuous support along the operating path of the film for the latter at a sound recording and reproducing station; a first pressure means positioned adjacent said sprocket, a second pressure means positioned adjacent the end of said longitudinal member remote from the sprocket whereby said film is constrained to said sprocket and longitudinal guide; a first means carrying electric current modulated to frequencies for sound recording, a mounting for said first recording means permitting movement of the latter to and from the sprocket with pressure means for forcing said recording means yieldingly towards the sprocket; a second means carrying electric current modulated to frequencies for reproducing sound recorded by said first means, a mounting for said second current bearing means permitting movement of the latter to and from said longitudinal member with pressure means for forcing said reproducing means yieldingly toward said longitudinal member; said first and second current bearing means having magnetic shielding means therebetween permitting close positioning of said current bearing members along said sprocket and guide.

16. The invention according to claim 15 having a flexible film backing member between the film and said longitudinal member and said sprocket, a driving connection between said backing member and said sprocket, and in the absence of propelling tension in the film pressure adhesive connection between said backing and said film for propelling the latter.

References Cited in the file of this patent

UNITED STATES PATENTS

| | | |
|---|---|---|
| 1,308,065 | Hajek | July 1, 1919 |
| 1,761,619 | De Forest | June 3, 1930 |
| 1,877,731 | Kuchenmeister | Sept. 13, 1932 |
| 2,050,494 | Lindenberg, Jr. | Aug. 11, 1936 |
| 2,059,550 | Champion | Nov. 3, 1936 |
| 2,064,049 | Wurm et al. | Dec. 15, 1936 |
| 2,079,572 | Kiel | May 14, 1937 |
| 2,096,113 | Kiel | Oct. 19, 1937 |
| 2,213,246 | Heller | Sept. 3, 1940 |
| 2,276,871 | Press | Mar. 17, 1942 |
| 2,379,489 | Kreuzer | July 3, 1945 |
| 2,406,152 | Levine | Aug. 20, 1946 |
| 2,420,798 | Shepherd | May 30, 1947 |
| 2,439,446 | Begun | Apr. 13, 1948 |
| 2,518,556 | Kolb et al. | Aug. 15, 1950 |
| 2,535,480 | Begun | Dec. 26, 1950 |
| 2,550,916 | Davis | May 1, 1951 |

FOREIGN PATENTS

| | | |
|---|---|---|
| 353,388 | Great Britain | Jan. 15, 1930 |
| 943,701 | France | Oct. 11, 1948 |